March 5, 1929. J. M. LARSON 1,704,008
APPARATUS FOR CONTROLLABLY REGULATING TEMPERATURE
Filed Oct. 8, 1926 2 Sheets-Sheet 1
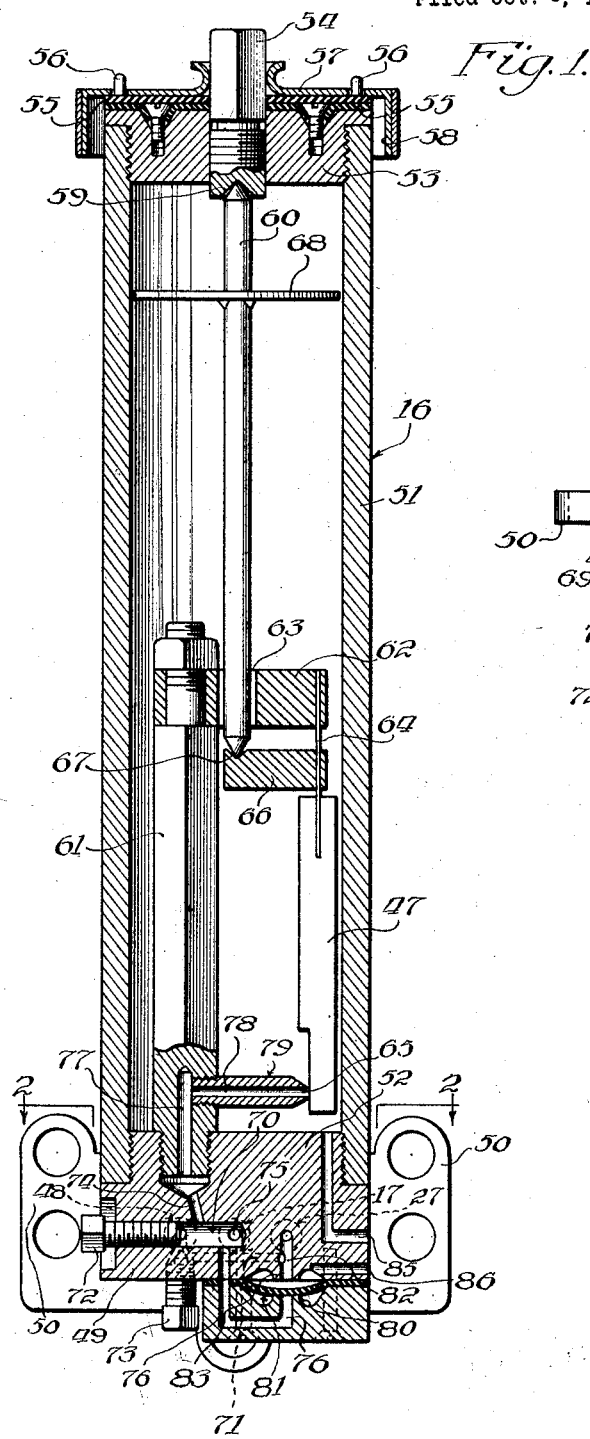
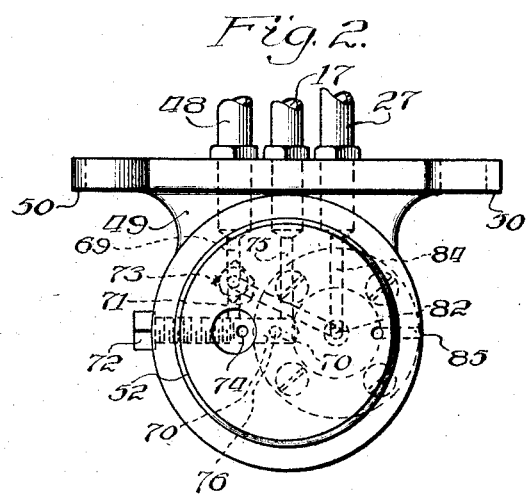
Inventor:
John M. Larson
By Jones, Addington, Ames & Seibold
Attys.

March 5, 1929.  J. M. LARSON  1,704,008
APPARATUS FOR CONTROLLABLY REGULATING TEMPERATURE
Filed Oct. 8, 1926  2 Sheets-Sheet 2

Inventor:
John M. Larson
By Jones, Addington, Ames & Seibold
Attys:

Patented Mar. 5, 1929.

1,704,008

UNITED STATES PATENT OFFICE.

JOHN M. LARSON, OF CHICAGO, ILLINOIS, ASSIGNOR TO NATIONAL REGULATOR CO., OF CHICAGO, ILLINOIS, A CORPORATION OF ILLINOIS.

APPARATUS FOR CONTROLLABLY REGULATING TEMPERATURE.

Application filed October 8, 1926. Serial No. 140,232.

This invention relates to apparatus for controllably regulating temperature, and more specifically concerns combined thermostatic control of air conditioning and circulating apparatus and of heat-radiating units.

In rooms, particularly such as offices and school-rooms, it is highly desirable that a desired uniform temperature be maintained and a plentiful supply of fresh air be circulated without requiring constant attention and without subjecting the occupants of the room to undesirable drafts, and the primary object of this invention is to provide automatically controllable means which will operate to produce and maintain the aforesaid desirable conditions and which is particularly adapted, through its possession of an unusually wide effective range, to so operate successfully during excessive variations in weather conditions.

Another and very important object of this invention is to provide a single adjustable controlling element which may be conveniently adjusted or set at a selected thermometric degree; which will operate automatically to control a combination of individually controllable elements forming a part of the aforesaid automatically controllable means; which possesses an unusually wide range of controlling effects; and which is so constructed that it may be readily taken apart and re-assembled, if desired, for inspection or repairs, or for any other reason.

In the drawings—

Figure 1 is a vertical sectional view of an adjustable compound thermostatic controller constructed according to this invention;

Fig. 2 is a horizontal sectional view of one end-member serving as the base of the controller, taken upon the line 2—2 of Fig. 1;

Figure 3:
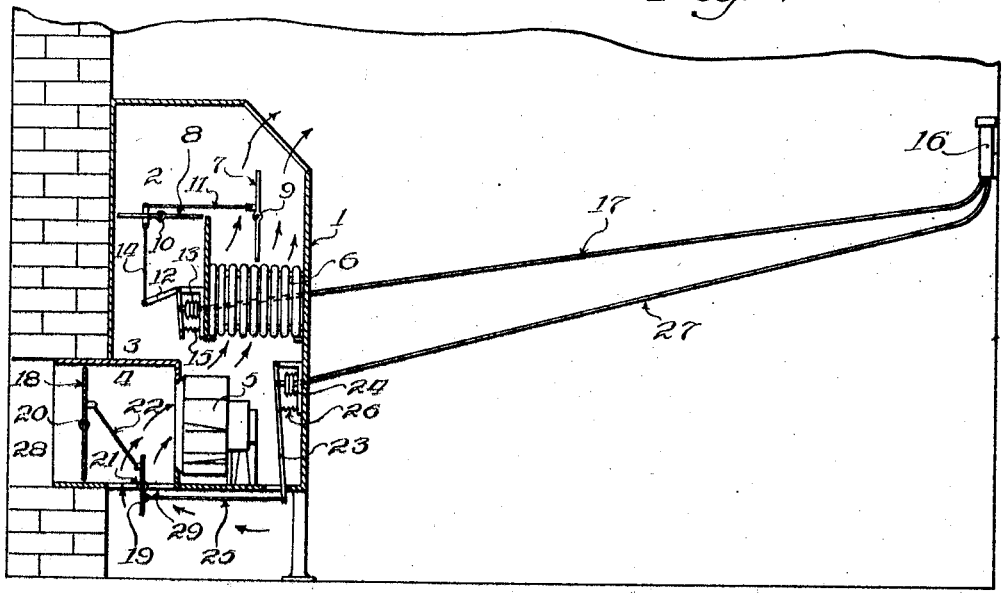
Figure 4:
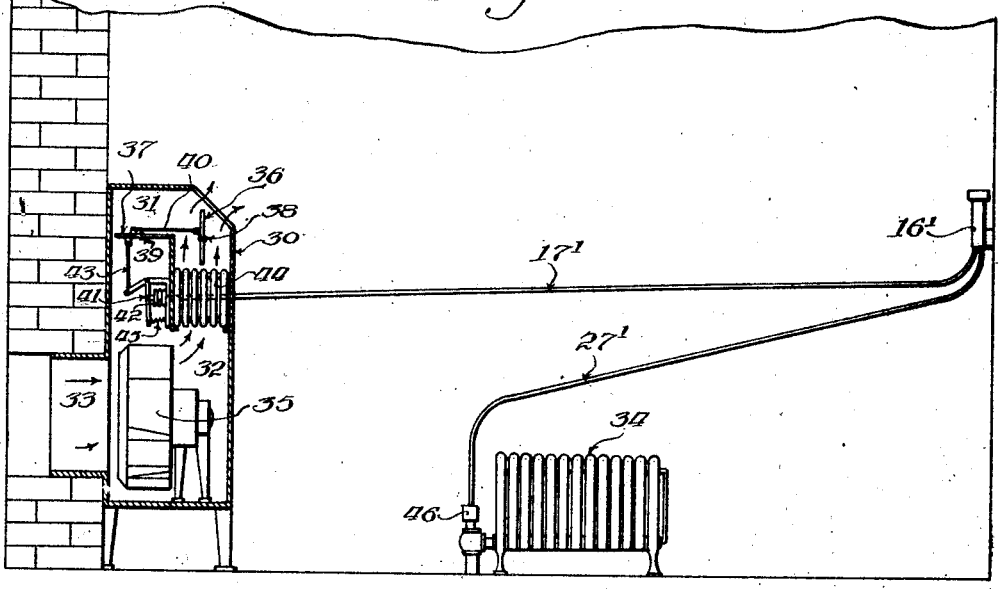

Fig. 3 is a vertical sectional view of one form of an air conditioning and circulating unit, having a novel arrangement of a plurality of automatically controllable elements which are shown connected for combined control by the single compound thermostatic controller illustrated in Fig. 1; and Fig. 4 is a vertical sectional view of a modified form of air conditioning and circulating unit, provided with a single automatically controllable element, this view also showing, in elevation, a separately located, automatically controllable, supplemental or auxiliary heat-radiating unit, illustrating the connection of said element and said heat-radiating unit for combined control by the aforesaid single compound thermostatic controller of Fig. 1.

In accordance with this invention, an adjustable compound thermostatic controller is provided for the combined control of an arrangement of air dampers and heat-radiating units to the effect that, with but a single control device, unusually wide ranges of controlling and regulating effects may be obtained, both in the degree of temperature desired to be produced and maintained and in the automatic compensation for excessive variations in weather conditions. While but one air conditioning and circulating unit and but one supplemental or auxiliary heat-radiating unit are shown and described herein in connection with the single thermostatic controller, it is to be understood that these units may be of different sizes and capacities and may be increased in number, either relatively or collectively, dependent upon various conditions which may exist, such, for example, as upon the size of the room and its location with respect to the direction of the prevailing winds. However, the number, size, and placement of the units are matters to be determined in the installation of the system and do not relate to the method of operation and control. It is sufficient, in this respect, to state that one or more of such units may be controlled by a single compound thermostatic controller.

In order to give a better understanding of the purpose and use of the compound thermostatic controller, it may be well, before describing its construction and operation, to describe the automatically controllable elements which are connected therewith and controlled in operation thereby.

Referring, first, to Fig. 3, it will be seen that the air conditioning and circulating unit therein shown comprises a casing 1, the interior of which is divided into three communicating chambers, 2, 3, and 4. As shown in this view, the output chamber 2 and the intake chamber 4 are both mixing chambers, the pair of air dampers for each of these chambers being so connected that, when one damper of a pair is fully open, the other damper of that pair is fully closed, and vice versa, but, while this arrangement is generally preferable in order to maintain a constant circulation of approximately the same volume of air, it is obvious that the relative sizes of the dampers may be different, and their connections may be changed even to the degree in which one damper of a pair may be fully closed before the other damper of that pair begins to open. The communication of the intake chamber 4 with the intermediate chamber 3 may be controlled by an electrically driven suction-fan 5, it being preferable, under certain conditions, to provide a forced draft. The intermediate chamber 3 houses a heat-radiating unit 6, and the heating medium supplied to this unit may be of any desired nature. In the drawings, the unit 6 represents a steam heated radiator, but a hot water or electrically heated unit could be used equally well in most instances. Furthermore, the supply of the heating medium to this unit 6 may be automatically controlled. It is to be understood that reasonable variations in the size, arrangement, and connection of the several dampers are within the scope of this invention, but the control of the operation of the fan 5 and the nature and control of the heating medium supplied to the unit 6 do not form a part of this invention and their service connections, which may be of any usual or desired form, are not shown.

Dampers 7 and 8 are shown pivotally supported at 9 and 10, respectively, and are operatively connected to each other, by the link 11, and to the operating lever 12 of a fluid-pressure motor 13, by the link 14. A spring 15 acts upon lever 12 to oppose the movement thereof by motor 13. The motor 13 is connected to be controlled in operation by the compound thermostatic controller 16, through the control-conduit 17. Dampers 18 and 19 are shown as pivotally supported at 20 and 21, respectively, and are operatively connected to each other, by the link 22, and to the operating lever 23 of a fluid-pressure motor 24, by the link 25. A spring 26 acts upon lever 23 to oppose the movement thereof by motor 24. The motor 24 is connected to be controlled in operation by the controller 16, through the control-conduit 27.

Damper 7 controls the output of air which passes through the heat-radiating unit 6 and damper 8 controls the output of air which is by-passed around said unit 6, while damper 18 controls an inlet 28 for admitting cold or fresh air and damper 19 controls an inlet 29 for admitting air from the lower part of the room for re-circulation. It will thus be seen that, with this arrangement, the operation of the several dampers will control the output of heated air as well as the admission of cold air, without restricting the circulation. Furthermore, regardless of the temperature of the room, the circulation of air may be increased by employing the fan 5. It is needless to describe the many variations and wide range of effects which may be obtained through the use and relative adjustments of the few elements already mentioned, but it is important to note that proper automatic control of these same elements provides for maintaining desired degrees of temperature within the room, while allowing for excessive variations in weather conditions.

In Fig. 4, the interior of the casing 30 of the air conditioning and circulating unit therein shown is divided into two communicating chambers, 31 and 32. The output chamber 31 constitutes a mixing chamber into which the heated and unheated air is controllably delivered the same as in chamber 2 of the previously described construction of Fig. 3, but the intake chamber 32 differs from the chamber 4 of said previously described construction. This chamber 32 is provided with a cold or fresh air inlet 33, but not with a re-circulating air inlet. Instead of re-circulating and re-heating air taken from the lower part of the room, as in the previously described construction of Fig. 3, a separately placed, supplemental heat-radiating unit 34 is arranged and controlled in operation to provide substantially, but not identically, similar effects. An electrically driven suction-fan 35 is shown arranged within the intake chamber 32 to serve the same purposes as those mentioned in connection with the fan 5 of Fig. 3.

Dampers 36 and 37 are shown as pivotally supported at 38 and 39, respectively, and are operatively connected with each other, by the link 40, and to the operating lever 41 of a fluid-pressure motor 42, by the link 43. Damper 36 controls the output of air which passes through the heat-radiating unit 44, and damper 37 controls the output of air which is by-passed around said unit 44. A spring 45 acts upon lever 41 to oppose the movement thereof by motor 42. The motor 42 is connected to be controlled in operation by the controller 16', through the control-conduit 17'.

The supplemental heat-radiating unit 34 is here shown as a conventional steam-heated radiator, but another type of heat-radiating unit could be substituted, if preferred. The supply of the heating medium to this unit 34 is controlled by a fluid-pressure motor located within the housing 46, which motor may be similar in construction and operation to the motor 42. This motor for controlling the supply of the heating medium to the heat-radiating unit 34 is connected to be controlled in operation by the controller 16', through the control-conduit 27'.

The operation of the parts thus far described is as follows. In the construction shown in Fig. 3, alternate supply and release of fluid-pressure through conduits 17 and 27 will effect the corresponding expansion and collapse of motors 13 and 24, respectively. Such supply and release of fluid-pressure through said conduits is automatically controlled by the compound thermostatic controller 16 in a manner to be presently described, it being sufficient at this point to state that, when the controller 16 has been "set" to effect and maintain a desired degree of temperature, the automatic controlling operation is such that increases in temperature slightly above said degree will occasion the aforesaid supply, and decreases in temperature slightly below said degree will occasion the aforesaid release, of fluid-pressure through the conduits 17 and 27.

The drawings show motor 13 and 24 as collapsed and the several dampers, 7, 8, 18 and 19, so positioned that the unit will operate to its full heating capacity, the entire intake being that of partially warmed air drawn from the lower part of the room through inlet 29, and the entire output being that of re-heated, or super-heated, air passed between the coils of heat-radiating unit 6. When the temperature of the room has increased to a predetermined degree, fluid-pressure will be supplied, through conduits 17 and 27, to motors 13 and 24, respectively. Motor 13 will be thereby expanded, moving lever 12, against the opposition of spring 15, to effect the opening of damper 8 and the closing of damper 7, through links 14 and 11, respectively, thus increasing the amount of air by-passed around the unit 6 and decreasing the amount of air passed between the coils of said unit into chamber 2, and thence outwardly into the room. Motor 24 will likewise be expanded, moving lever 23, against the opposition of spring 26, to effect the opening of damper 18 and the closing of damper 19, through links 22 and 25, respectively, thus increasing the amount of cold or fresh air admitted through inlet 28 and decreasing the amount of partially warmed air drawn from the lower part of the room through inlet 29.

In the construction shown in Fig. 4, the alternate supply and release of fluid-pressure through conduits 17' and 27' will effect the corresponding expansion and collapse of motor 42 and the motor within housing 46, respectively, and such supply and release of fluid-pressure is automatically controlled by the controller 16' in the same manner as that previously described in connection with the controller 16 of Fig. 3. The drawings here show motor 42 as collapsed and it is to be assumed that the motor within housing 46 is also collapsed. Dampers 36 and 37 are shown positioned so that the air conditioning and circulating unit will operate to its full heating capacity, and it is to be understood that the collapse of the motor within housing 46 has effected the supply of the heating medium to supplemental unit 34 so that it is operating to its full heat-radiating capacity. When the temperature of the room has increased to a predetermined degree, fluid-pressure will be supplied, through conduits 17' and 27', to motor 42 and the motor within housing 46. Motor 42 will be thereby expanded, moving lever 41, against the opposition of spring 45, to effect the opening of damper 37 and the closing of damper 36, through links 43 and 40, respectively, thus increasing the amount of air by-passed around the heat-radiating unit 44 and decreasing the amount of air passed between the coils of said unit into chamber 31, and thence outwardly into the room. The motor within housing 46 will likewise be expanded and shut off the supply of the heating medium to supplemental unit 34.

It is needless to describe, in detail, the return of the several parts to their positions as shown in the drawings, it being sufficient to state that, when the temperature of the room has decreased to a predetermined degree, the fluid-pressure will be automatically released, through the control of the respective controllers 16 and 16', and the respective motors connected therewith, through conduits 17, 27, 17' and 27', will collapse, the collapse of motors 13, 24, and 42 being assisted by the action of the respective springs 15, 26, and 45. The collapse of the motor within housing 46 may be assisted by a spring (not shown) acting in a similar manner, or, where a steam heated radiator is employed, as shown in Fig. 4, it may be effected by the valve-opening pressure of the steam in the supply-pipe.

While, as hereinbefore stated, the employment of the fans 5 and 35 do not form a part of this invention, it may be well to direct attention to the fact that the efficiency of both types of air conditioning and circulating units herein shown may be augmented thereby. In the construction shown in Fig. 3, both the air-heating and air-cooling functions of the unit may be materially increased by employing a forced draft, and this is so, in somewhat lesser degree, with the construction shown in Fig. 4. With both constructions, should the direction of the wind be such as to interfere with the proper intake of fresh out-door air, the suction-fan could be used to correct such a condition.

Referring, now, to Figs. 1 and 2, the compound thermostatic controller therein shown is the element indicated at 16 in Fig. 3 and at 16' in Fig. 4. For convenience in description, the following detailed explanation of the construction and operation of the controller will refer to its operative association with the elements shown in Fig. 3, but it is to be understood that all of its parts function in exactly the same manner when it is operatively associated with the elements shown in Fig. 4.

The controller 16 comprises a single thermostatically actuated valve 47 which controls the supply and release of fluid-pressure to and from the two individual control-conduits 17 and 27. Fluid-pressure is supplied to the controller, through a supply-conduit 48, from a source (not shown) which may be suitably constructed and located as preferred. Although the supply and release of fluid-pressure to and from the two conduits 17 and 27 is controlled by the single valve 47, such supply and release is effected gradually with respect to conduit 17 and positively with respect to conduit 27, the result being that the motor 13 (Fig. 3), connected with conduit 17, will be correspondingly expanded and collapsed gradually and proportionately with increases and decreases in temperature, while the motor 24, connected with conduit 27, will be correspondingly completely expanded and completely collapsed without such graduated and proportionate movement.

An end-member, herein shown as a base 49, is provided with ears 50 by which the controller is secured in position, preferably upright upon the wall of the room at a point distant from the air conditioning and circulating units and the heat-radiating units which it is designed to operatively control. Supported upon base 49 is a tube 51 of material possessing a high co-efficient of expansion. Tube 51 is internally threaded at each end-part thereof, one end being screwed upon a boss 52 of base 49 and the other fitted with an end-member, herein shown as a screw-plug 53, having a centrally arranged threaded orifice fitted with an adjusting screw 54. Any preferred means may be employed for adjusting the screw 54. As herein shown, the upper end-part of the screw is squared and operatively engaged by a circular steel wrench-plate 55, and wrench-plate 55 is provided with a pair of upstanding pins 56 which project through corresponding apertures in a superposed cap, or adjusting plate 57. Plate 57 is formed with a depending annular flange 58 suitable to be engaged by the fingers for adjustment and provided with a thermometric scale to be used for setting the controller for operation at different desired degrees of temperature.

The lower end of screw 54 is cupped at 59 to receive the upper pointed end of a rod 60, preferably formed of material possessing a low co-efficient of expansion. A post 61 is rigidly supported by base 49 to project upwardly within tube 51, and the upper end-part of this post carries a rigidly fixed, laterally extending arm 62. Arm 62 is apertured at 63 to receive and guide the lower end-part of rod 60 and also serves to support the valve 47 by means of the flat spring connection 64, the upper and lower ends of which are respectively anchored in the arm 62 and the valve 47. In addition to serving as a support for valve 47, the spring connection 64 acts to yieldingly hold the valve closed over the port 65 and also carries a laterally extending arm 66, by which the resistance of the spring connection may be overcome and the valve moved to open the port. Near its free end, the upper surface of arm 66 is provided with a cup 67 which receives the lower pointed end of the rod 60. A guiding flange, such as the disc or spider 68 upon rod 60, facilitates the replacement of the upper pointed end of the rod in the screw-cup 59, if for any reason the tube 51 has been unscrewed and removed from base 49, or the plug 53 has been removed from the tube.

Changes in temperature will effect the longitudinal contraction and expansion of the tube 51. As viewed in Fig. 1, contraction of the tube, which will be occasioned by a decrease in temperature, will draw plug 53 toward base 49, forcing rod 60 downwardly upon arm 66 and thereby flexing spring connection 64 and moving valve 47 to open the port 65. Conversely, expansion of the tube 51, which will be occasioned by an increase in temperature, will move plug 53 away from base 49; rod 60 will remain at rest upon the arm 66, since the closed valve 47 prevents the spring connection 64 from raising said arm; and the cupped end of screw 54 will be lifted away from the upper end of the rod, the disc or spider 68 then serving to keep the rod properly positioned for re-engagement with screw 54 when it is lowered, either by a subsequent contraction of tube 51 or by the adjustment of the screw in its threaded relation with plug 53 through movement of the adjusting plate 57. Obviously, if a contraction of tube 51 has effected the opening of valve 47 in the manner just described, a subsequent expansion of the tube will first effect the closing of the valve before the screw 54 will be lifted away from the upper end of the rod. However, under normal operating conditions, this described lifting of the screw 54 away from the upper end of the rod 60 will not often occur, since the gradual closing of the port 65 by valve 47 will be represented by corresponding adjustments in the air conditioning and heating apparatus controlled thereby, and increases in the temperature would be arrested before reaching such a degree. Hot weather conditions, or a radical adjustment of plate 57 might effect this described unusual result, but there would be no disarrangement of any of the parts. Under ideal service conditions, valve 47 will be maintained in a state of floating equilibrium over port 65, acting to control the amount of fluid-pressure allowed to escape therefrom and thus govern the degree of fluid-pressure supplied to conduit 17 in a manner to be presently more fully explained.

Within base 49, a supply-duct 69 extends from supply-conduit 48 and is connected with two passages 70 and 71, the connection with these passages being controlled, respectively, by adjustable needle-valves 72 and 73. Passage 70 connects with an outlet-duct 74, a control-duct 75, and a passage 76. Outlet-duct 74 leads to port 65, through a vertically extending passage 77, provided in the lower end-part of post 61, and a laterally extending outlet 78 in the nozzle 79. Control-duct 75 leads directly to conduit 17, and passage 76 terminates in a port opening upon the upwardly presented face of a boss 80, which is centrally arranged in a recess or chamber beneath a flexible diaphragm 81. Passage 71 connects with a short vertically extending passage 82, the lower end of which terminates in a port opening upon the downwardly presented face of a boss 83, which is centrally arranged in a recess or chamber above diaphragm 81, and the upper end of passage 82 connects with a laterally extending control-duct 84 leading directly to conduit 27. An outlet-duct 85 is provided in base 49 for venting the interior of tube 51 to the outer air, and an outlet-duct 86 vents the annular recess or chamber surrounding boss 83 above diaphragm 81.

Needle-valve 72 is designed to be adjusted so that the amount of fluid-pressure permitted to pass to its respective ducts and passages, and to the recess or chamber beneath diaphragm 81 and conduit 17, will not equal the amount which valve 47, when fully open, will allow to escape from port 65 and thence, through outlet-duct 85, to the outer air, and needle-valve 73 is likewise designed to be adjusted so that the amount of fluid-pressure permitted by it to pass to its respective duct and passages, and to the recess or chamber above diaphragm 81 and conduit 27, will not equal the amount which diaphragm 81, when lowered as shown in Fig. 1, will allow to escape from the lower end of passage 82 and thence, through outlet-duct 86, to the outer air.

With the parts positioned as shown in Fig. 1, it is to be assumed for the moment that fluid-pressure is not being supplied to the system. The closed position of valve 47 over port 65 indicates, however, that the temperature of the room is slightly above the degree for which the controller has been set, tube 51 having expanded sufficiently to effect such closure but not enough to have lifted screw 54 away from the upper end of rod 60. Upon the supply of fluid-pressure through supply-conduit 48 to supply-duct 69, a limited amount will pass needle-valve 73, into passage 71, to passage 82, out through the port in boss 83, over diaphragm 81, and out to the atmosphere through outlet duct 86. This escape of fluid-pressure from the open lower end of passage 82 prevents any accumulation of pressure in the laterally extending control-duct 84 connected with the upper end of passage 82 and leading to conduit 27. A limited amount of fluid-pressure will also pass needle-valve 72, into passage 70, but will be prevented from escaping through outlet-duct 74, passage 77, and outlet 78, since port 65 is closed by valve 47, and pressure will begin to accumulate in control-duct 75 and conduit 17, and also in passage 76. As the pressure accumulates in conduit 17, motor 13 (Fig. 3) is thereby proportionately expanded and dampers 7 and 8 are correspondingly adjusted in accordance with the degree to which pressure in conduit 17 is permitted to accumulate. The lowered position of diaphragm 81 seals the comparatively small terminal port of passage 76 in the boss 80 and, since the entire upper surface of the diaphragm is exposed to the effect of the fluid-pressure which is passing from passage 82 to outlet-duct 86, the diaphragm will be maintained in such lowered position until sufficient pressure has accumulated in passage 76 to slightly lift the centre of the diaphragm. As soon as this occurs, the fluid-pressure in passage 76 will extend to the annular recess or chamber surrounding boss 80 and, acting then upon the entire lower surface of the diaphragm, will force the diaphragm against boss 83, instantly stopping the escape of fluid-pressure from passage 82 to outlet-duct 86. Pressure now begins to accumulate in passage 82, control-duct 84, and conduit 27 and, as it accumulates, motor 24 (Fig. 3) is thereby entirely expanded and damper 18 closed and 19 open recirculating air in room. From the foregoing description, it will be seen that, with the valve 47 completely closed, there will be an appreciable length of time between the periods at which pressure begins to accumulate in the two conduits 17 and 27; that is to say, there must be a sufficient accumulation of pressure in conduit 17 to effect the operation of diaphragm 81 and stop the escape of fluid-pressure through outlet-duct 86 before pressure can begin to accumulate in conduit 27. It will also be noted that the speed with which pressure may accumulate in each of said conduits may be definitely adjusted for each conduit by the respective needle-valves 72 and 73. If port 65 had been partly open, it would have delayed the described accumulation of pressure in conduit 17, and thereby have slowed up the expansion of motor 13 and the operation of diaphragm 81. Such delay in the operation of diaphragm 81 would have similarly delayed the period at which pressure began to accumulate in conduit 27, so that, with the needle-valves properly adjusted with relation to each other and the employment of a sufficiently sensitive motor 13, a considerable adjustment of dampers 7 and 8 may be obtained before, and even without, occasioning the operation of motor 24 and the consequent adjustment of dampers 18 and 19.

Returning, now, to the description of the thermostatic operation of the controller 16 and assuming that motors 13 and 24 have been completely expanded by the aforesaid supply of fluid-pressure to the respective conduits 17 and 27, the temperature of the room will begin to decrease, due to the cooling effect produced by the reversed positions of all of the dampers 7, 8, 18 and 19, from the positions thereof shown in Fig. 3. As the room temperature thus decreases, tube 51 of the controller will contract and force rod 60 downwardly upon the extending end of arm 66, flex spring connection 64 and begin the opening of valve 47. The slightest opening of port 65 by this opening movement of valve 47 will weaken the degree of pressure in conduit 17 and be represented by a corresponding partial collapse of motor 13 and adjustment of dampers 7 and 8, but will not at first sufficiently weaken the pressure beneath diaphragm 81 to allow it to uncover the terminal port of passage 82 in boss 83, the pressure applied beneath the diaphragm acting upon its entire under surface, while the opposing effect of the pressure in passage 82 is at this time exerted only upon the comparatively small area of the upper surface of the diaphragm actually covering the terminal port of passage 82 in boss 83. It is thus evident that a considerable reduction of pressure may occur in conduit 17 before the fluid-pressure in conduit 27 begins to be released, and it follows that motor 13 (Fig. 3) may collapse and adjust dampers 7 and 8 to a considerable extent before motor 24 will be permitted to collapse and change the adjustment of dampers 18 and 19 at all.

Under normal weather and heating conditions, it is to be presumed that at some point in the opening of port 65, valve 47 will become somewhat stabilized in position, allowing enough of the fluid-pressure passing needle-valve 72 to escape from port 65 to maintain motor 13 and dampers 7 and 8 in intermediate positions of adjustment. Should the room temperature continue to decrease, tube 51 will be correspondingly further contracted, valve 47 will be further opened, and dampers 7 and 8 further adjusted to increase the amount of air passed through heat-radiating unit 6 and decrease the amount of air by-passed around said unit. When the pressure in passage 76 has been weakened by this further opening of valve 47 to a degree at which it can no longer hold diaphragm 81 against the opposing action of the accumulated pressure in passage 82, the diaphragm will drop and allow the fluid-pressure in passage 82 to escape over the diaphragm and out through outlet duct 86, resulting in the release of fluid-pressure from conduit 27 and the collapse of motor 24, thereby restoring dampers 18 and 19 to their positions shown in Fig. 3. This dropping of diaphragm 81 will be accelerated by the action of the accumulated pressure in passage 82 extending over the entire upper surface of the diaphragm, and the diaphragm will be moved positively into its lowered position, as shown in Fig. 1, sealing the terminal port of passage 76 in the boss 80.

As hereinbefore stated, the controller 16' and conduits 17' and 27' of Fig. 4 are identical in all respects with the controller 16 and conduits 17 and 27 of Fig. 3, just described. Motor 42 and the motor in housing 46 operate and are controlled in operation in the same manner as are motors 13 and 24, respectively, and it follows that the control of dampers 36 and 37 will be the same as that of dampers 7 and 8, while the automatic admission and shutting off of the heating medium to heat-radiating unit 34 will be occasioned in the same manner as that just described in connection with the adjustment of dampers 18 and 19. The modified arrangement of Fig. 4 may be more desirable in some locations and under certain circumstances and conditions, but the application of compound thermostatic control of the elements therein illustrated is the same as described in connection with the elements illustrated in Fig. 3.

It has been pointed out that there will be an appreciable length of time between the periods at which pressure begins to accumulate in the two conduits 17 and 27, and that a considerable adjustment of dampers 7 and 8 may be obtained before, and even without, occasioning the operation of motor 24 and the consequent adjustment of dampers 18 and 19. It has also been mentioned and shown that a considerable reduction of pressure may occur in conduit 17 before the pressure in conduit 27 begins to be released, and that dampers 7 and 8 may be adjusted to a considerable extent before motor 24 will be permitted to collapse and change the adjustment of dampers 18 and 19 at all.

This delay in the supply and release of fluid-pressure in conduit 27 has an important bearing in the operation of the system, which may perhaps be more readily understood by referring to Fig. 4, wherein the separately placed supplemental heat-radiating unit 34 is shown as controlled through conduit 27' and, in this respect, takes the place of dampers 18 and 19 controlled through the conduit 27 of Fig. 3. As its name implies, the supplemental unit 34 is employed as an auxiliary element, or "booster", to assist the air-heating capacity of the air conditioning and circulating unit, and the same may be said of the employement of dampers 18 and 19. When the room temperature decreases and the consequent automatic adjustment of the dampers controlled through conduit 17 (Fig. 3), or 17' (Fig. 4), does not arrest such decrease in temperature, the dampers 18 and 19 (Fig. 3), or the supplemental heat-radiating unit 34 (Fig. 4), will be automatically brought into operation to assist in arresting such decrease and in restoring the desired temperature. With such assistance, the automatic adjustment of the dampers controlled through conduit 17, or 17', may maintain the desired temperature, and such assistance will be continued as long as necessary. As the room temperature now increases, the dampers controlled through conduit 17, or 17', will be automatically adjusted to arrest such increase and, if their adjustment will not sufficiently counteract the additional heating assistance provided by the previous adjustment of dampers 18 and 19, or the use of unit 34, their assistance will be automatically dispensed with to assist in arresting such increase and in restoring the desired temperature.

It will thus be understood that the delayed operation of the elements controlled through conduit 27, or 27', affords a degree of flexibility in control, permitting valve 47 of the controller 16 to find and occupy a substantially stabilized floating position over port 65, serving normally to determine the amount of fluid-pressure to be allowed to escape from port 65 and thus maintain a substantially even temperature by slight adjustments of the dampers controlled through conduit 17, or 17', bringing in the additional service controlled through conduit 27, or 27', only when normal conditions are disturbed and are to be restored.

While I have described but two embodiments of my invention, it is obvious that many modifications therein may occur to those skilled in the art, and I desire, therefore, that my invention be limited only by the scope of the appended claims and by the prior art.

I claim:

1. A thermostatic controller comprising a thermally expansible and contractible tube, a member secured to one end-part of said tube, a fluid-pressure supply-conduit and a plurality of fluid-pressure control-conduits connected with said member, a supply-duct and a plurality of control-ducts in said member connected respectively with said supply-conduit and said control-conduits, passages individually connecting said supply-duct with said control ducts, individually adjustable means restricting the passage of fluid-pressure from said supply-duct to each of said passages, outlet-ducts individually connected with a first and a second of said passages and terminating in first and second outlet-ports, respectively, a first valve actuated by the expansion and contraction of said tube to effect a proportionately graduated control of said first outlet-port, a second valve actuated by fluid-pressure to effect the control of said second outlet-port, and a passage connecting said second valve with said first of said passages.

2. A thermostatic controller comprising a thermally expansible and contractible tube, a member secured to one end-part of said tube, a fluid-pressure supply-conduit and a plurality of fluid-pressure control-conduits connected with said member, a supply-duct and a plurality of control-ducts in said member connected respectively with said supply-conduit and said control-conduits, passages individually connecting said supply-duct with said control-ducts, individually adjustable means restricting the passage of fluid-pressure from said supply-duct to each of said passages, outlet-ducts individually connected with a first and a second of said passages and terminating in first and second outlet-ports, respectively, a first valve actuated by the expansion and contraction of said tube to effect a proportionately graduated control of said first outlet-port, a diaphragm-valve actuated by fluid-pressure to control said second outlet-port, a sealed chamber of which said diaphragm-valve forms a flexible wall, and a passage connecting said chamber with said first of said passages.

3. A thermostatic construction for controlling two fluid-pressure motors, comprising an air passage for communication with the pressure supply, two restricted branch passages leading from said pressure passage, an exhaust port and a passage leading to one of said pressure motors, both said exhaust port and said passage being in communication with one of said branch passages whereby when said exhaust port is closed said pressure motor will be expanded and whereby when said exhaust port is open said pressure motor will be exhausted, a thermostatic valve for controlling said exhaust port, another exhaust port and a passage leading to the other pressure motor, both said other exhaust port and said passage being in communication with the other of said branch passages, whereby when said exhaust passage is closed said pressure motor will be expanded and whereby when said exhaust port is open said pressure motor will be exhausted, and a motor device controlled by the pressure in said one of said branch passages for controlling the exhaust from the exhaust port for said other of said branch passages, and means whereby an increase of temperature causes the thermostatic valve to close.

In witness whereof, I have hereunto subscribed my name.

JOHN M. LARSON.